US010331641B2

(12) United States Patent
Zhang et al.

(10) Patent No.: US 10,331,641 B2
(45) Date of Patent: Jun. 25, 2019

(54) HASH DATABASE CONFIGURATION METHOD AND APPARATUS

(71) Applicant: Huawei Technologies Co., Ltd., Shenzhen (CN)

(72) Inventors: Lei Zhang, Chengdu (CN); Dong Bao, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 309 days.

(21) Appl. No.: 15/087,053

(22) Filed: Mar. 31, 2016

(65) Prior Publication Data

US 2016/0217167 A1    Jul. 28, 2016

Related U.S. Application Data

(63) Continuation of application No. PCT/CN2014/083070, filed on Jul. 25, 2014.

(30) Foreign Application Priority Data

Nov. 29, 2013 (CN) .......................... 2013 1 0627860

(51) Int. Cl.
*G06F 17/30* (2006.01)
*G06F 16/22* (2019.01)
(Continued)

(52) U.S. Cl.
CPC .......... *G06F 16/2228* (2019.01); *G06F 3/065* (2013.01); *G06F 3/0619* (2013.01);
(Continued)

(58) Field of Classification Search
CPC ........... G06F 17/3033; G06F 2212/652; G06F 16/2255; G06F 16/9024; G06F 17/30321
(Continued)

(56) References Cited

U.S. PATENT DOCUMENTS 6,067,547 A * 5/2000 Douceur ............. G06F 16/2255
9,086,913 B2 * 7/2015 Shanbhogue ......... G06F 9/4812
(Continued)

FOREIGN PATENT DOCUMENTS

CN     101510209 A     8/2009
CN     102402394 A     4/2012
(Continued)

OTHER PUBLICATIONS

Foreign Communication From a Counterpart Application, European Application No. 14865948.5, Extended European Search Report dated Sep. 5, 2016, 8 pages.
(Continued)

*Primary Examiner* — Marcin R Filipczyk
(74) *Attorney, Agent, or Firm* — Conley Rose, P.C.

(57) ABSTRACT

A hash database configuration method and apparatus, where the method includes establishing an index area and a data area on a disk, where the index area includes p disk pages with an equal size, and receiving an allocation request of key-value pairs, allocating m keys in the key-value pairs to disk pages in the index area, and allocating n values in the key-value pairs to the data area, where m, n, and p are all integers greater than 1, and the efficiency of accessing the hash database is improved.

10 Claims, 4 Drawing Sheets

(51) Int. Cl.
*G06F 16/901* (2019.01)
*G06F 3/06* (2006.01)

(52) U.S. Cl.
CPC ........ *G06F 3/0674* (2013.01); *G06F 16/2255* (2019.01); *G06F 16/9024* (2019.01)

(58) Field of Classification Search
USPC .................................................. 707/737, 747
See application file for complete search history.

(56) References Cited

U.S. PATENT DOCUMENTS

| | | | | |
|---|---|---|---|---|
| 2010/0257181 | A1* | 10/2010 | Zhou | G06F 16/2255 707/747 |
| 2012/0110236 | A1* | 5/2012 | Ali | G06F 12/1009 711/6 |
| 2013/0007008 | A1 | 1/2013 | Yuan et al. | |
| 2013/0250686 | A1 | 9/2013 | Marukame et al. | |
| 2013/0268770 | A1 | 10/2013 | Hunt et al. | |
| 2015/0127649 | A1* | 5/2015 | Felch | G06F 12/0238 707/737 |
| 2015/0149476 | A1 | 5/2015 | Lv | |

FOREIGN PATENT DOCUMENTS

| | | | |
|---|---|---|---|
| CN | 102591792 | A | 7/2012 |
| CN | 102982182 | A | 3/2013 |
| CN | 103186668 | A | 7/2013 |
| CN | 103593477 | A | 2/2014 |

OTHER PUBLICATIONS

Foreign Communication From a Counterpart Application, Chinese Application No. 201310627860.3, Chinese Search Report dated Oct. 14, 2016, 2 pages.
Foreign Communication From a Counterpart Application, Chinese Application No. 201310627860.3, Chinese Office Action dated Oct. 27, 2016, 6 pages.
Partial English Translation and Abstract of Chinese Patent Application No. CN103186668, Jul. 11, 2016, 16 pages.
Partial English Translation and Abstract of Chinese Patent Application No. CN102591792, Mar. 26, 2016, 4 pages.
Partial English Translation and Abstract of Chinese Patent Application No. CN103593477, Mar. 26, 2016, 3 pages.
Wang, C., et al., "Design and Implement of Index Structure of Database Based on Hash Table," Microprocessors, vol. 4, Aug. 2007, 4 pages.
English Translation of Wang, C., et al., "Design and Implement of Index Structure of Database Based on Hash Table," Microprocessors, vol. 4, Jul. 25, 2016, 8 pages.
Foreign Communication From a Counterpart Application, Chinese Application No. 201310627860.3, Chinese Office Action dated Feb. 25, 2016, 5 pages.
Foreign Communication From a Counterpart Application, Chinese Application No. 201310627860.3, Chinese Search Report dated Feb. 17, 2016, 2 pages.
Foreign Communication From a Counterpart Application, PCT Application No. PCT/CN2014/083070, English Translation of International Search Report dated Oct. 27, 2014, 3 pages.
Foreign Communication From a Counterpart Application, PCT Application No. PCT/CN2014/083070, English Translation of Written Opinion dated Oct. 27, 2014, 9 pages.

\* cited by examiner

S101
Establish an index area and a data area on a disk, where the index area includes p disk pages with an equal size S102
Receive an allocation request of key-value pairs, allocate m Keys in the key-value pairs to disk pages in the index area, and allocate n Values in the key-value pairs to the data area, where m, n, and p are all integers greater than 1

HASH DATABASE CONFIGURATION METHOD AND APPARATUS

CROSS-REFERENCE TO RELATED APPLICATIONS

This application is a continuation of International Application No. PCT/CN2014/083070, filed on Jul. 25, 2014, which claims priority to Chinese Patent Application No. 201310627860.3, filed on Nov. 29, 2013, both of which are hereby incorporated by reference in their entireties.

TECHNICAL FIELD

The present disclosure relates to the computer field, and in particular, to a hash database configuration method and apparatus.

BACKGROUND

With network development, information grows explosively, and data of people reaches an unprecedented scale. Storage and management of the data on a very large scale have become a big challenge. A peer to peer (P2P) storage system based on a distributed hash table (DHT) technology has high scalability and supports large-scale data storage, and therefore can address this challenge well. An underlying storage engine of this storage system is generally a key-value database, which is hereinafter referred to as a K-V database, that is, a non-relational database for storing and accessing data in a form of a key-value pair. Common data access operations of the storage system include insertion, search, and deletion, and a data access form is generally as follows: put (key, &value), get (key, &value), or delete (key), where key is a unique identifier of data and value is content of the data. In the following description, put, get, and delete are respectively corresponding to an inserting operation, a searching operation, and a deleting operation.

A variable-length hash K-V database is a common hash database. This database can store a variable-length key and value. A basic principle of this database is to determine a storage location of each key and value using a hash algorithm, and when a hash collision is encountered, use a specific data structure and a binary-tree algorithm to resolve the collision. A logical structure of this database is shown in FIG. 1. In FIG. 1, the hash K-V database is logically divided into four parts, which are as follows. Bucket array, that is, a hash bucket whose size is a size of a hash space, where content stored in the hash bucket is a location of each key-value pair in a corresponding storage medium. Key, that is, a key of each key-value pair, storing a value of the key. Value, that is, a value of each key-value pair, storing a value of the value, and Ptr, that is, when the hash collision occurs, storing a location (or an offset) of a next key-value pair with a same hash value. The foregoing components form a general structure of the hash K-V database.

Because the hash algorithm is used, according to an inherent feature of the hash algorithm, an equal hash value may be obtained when inputs are different. A key to performance design of this variable-length hash K-V database lies in a manner of handling a hash collision. Because a binary tree is used in the database to resolve a collision between key-value pairs, when a data volume is too large, the tree is relatively deep. Every time when a key-value on a leaf node needs to be read or updated, some nodes on an entire binary tree on a disk needs to be randomly read. Consequently, a performance jitter is so large that a long tail of performance is formed. When the data volume is relatively large and pressure is relatively high, a case in which the performance dramatically degrades may occur.

SUMMARY

Embodiments of the present disclosure provide a hash database configuration method and apparatus, which can overcome a disadvantage of low efficiency of accessing an existing hash database.

To solve the foregoing technical problem, the present disclosure provides a hash database configuration method, including establishing an index area and a data area on a disk, where the index area includes p disk pages with an equal size, and receiving an allocation request of key-value pairs, allocating m keys in the key-value pairs to disk pages in the index area, and allocating n values in the key-value pairs to the data area, where m, n, and p are all integers greater than 1.

In a first possible implementation manner, the step of allocating m keys in the key-value pairs to disk pages in the index area includes selecting a to-be-allocated key from the m keys and performing a hash operation on the to-be-allocated key to obtain a hash value, performing, according to the hash value and a quantity p of the disk pages, a modulo operation to obtain a serial number of a disk page to be allocated to, and storing the to-be-allocated key on the disk page corresponding to the serial number.

With reference to the first possible implementation manner of the first aspect, in a second possible implementation manner, the method further includes establishing an extended area on the disk, where the extended area includes q extended pages with an equal size, and q is an integer greater than 1, and if a disk page in the index area overflows, storing an overflowed key on an extended page.

With reference to the second possible implementation manner of the first aspect, in a third possible implementation manner, the step of storing the to-be-allocated key on the disk page corresponding to the serial number includes, if a remaining capacity of the disk page corresponding to the serial number is less than a length of the to-be-allocated key, searching the extended area for an extended page whose remaining capacity is greater than the length of the to-be-allocated key, and storing the to-be-allocated key on the extended page.

With reference to the third possible implementation manner of the first aspect, in a fourth possible implementation manner, the method further includes managing, using a bitmap technology, allocation and reclaiming of the q extended pages in the extended area.

With reference to the fourth possible implementation manner of the first aspect, in a fifth possible implementation manner, the method further includes forming a disk page and an extended page that have a same hash value into a linked list, where the disk page is located at the head of the linked list.

With reference to the fifth possible implementation manner of the first aspect, in a sixth possible implementation manner, the method further includes establishing a backup area on the disk, and copying a duplicate of data in the index area and a duplicate of data in the extended area to the backup area, where the backup area is not adjacent to the index area or the extended area.

According to a second aspect, the present disclosure provides a hash database configuration apparatus, including an establishing module configured to establish an index area and a data area on a disk, where the index area includes p disk pages with an equal size, and an allocating module configured to receive an allocation request of key-value pairs, allocate m Keys in the key-value pairs to disk pages in the index area, and allocate n Values in the key-value pairs to the data area, where m, n, and p are all integers greater than 1.

In a first possible implementation manner, the allocating module includes a calculating unit configured to select a to-be-allocated key from the m keys and perform a hash operation on the to-be-allocated key to obtain a hash value, a modulo operation performing unit configured to perform, according to the hash value and a quantity p of the disk pages, a modulo operation to obtain a serial number of a disk page to be allocated to, and an allocating unit configured to store the to-be-allocated key on the disk page corresponding to the serial number.

With reference to the first possible implementation manner of the second aspect, in a second possible implementation manner, the apparatus further includes an overflow control module configured to establish an extended area on the disk, where the extended area includes q extended pages with an equal size, and q is an integer greater than 1, and if a disk page in the index area overflows, store an overflowed key on an extended page.

With reference to the second possible implementation manner of the second aspect, in a third possible implementation manner, the allocating unit is configured to, if a remaining capacity of the disk page corresponding to the serial number is less than a length of the to-be-allocated key, search the extended area for an extended page whose remaining capacity is greater than the length of the to-be-allocated key, and store the to-be-allocated key on the extended page.

With reference to the third possible implementation manner of the second aspect, in a fourth possible implementation manner, the apparatus further includes a management module configured to manage, using a bitmap technology, allocation and reclaiming of the q extended pages in the extended area.

With reference to the fourth possible implementation manner of the second aspect, in a fifth possible implementation manner, the apparatus further includes a generating module configured to form a disk page and an extended page that have a same hash value into a linked list, where the disk page is located at the head of the linked list.

With reference to the fifth possible implementation manner of the second aspect, in a sixth possible implementation manner, the apparatus further includes a backup module configured to establish a backup area on the disk and copy a duplicate of data in the index area and a duplicate of data in the extended area to the backup area, where the backup area is not adjacent to the index area or the extended area.

Implementation of the present disclosure brings the following beneficial effects.

By separating a key from a value in a key-value pair in a hash database, the key and the value are respectively stored into an index area and a data area that are established on a disk, when an operation request for the hash database is received, generating of a large quantity of disk input/output (IO) operations is avoided, and when a quantity of key-value pairs is relatively large, a quantity of the disk IO operations is stable, thereby improving operation efficiency of the hash database.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figures 1, 2:
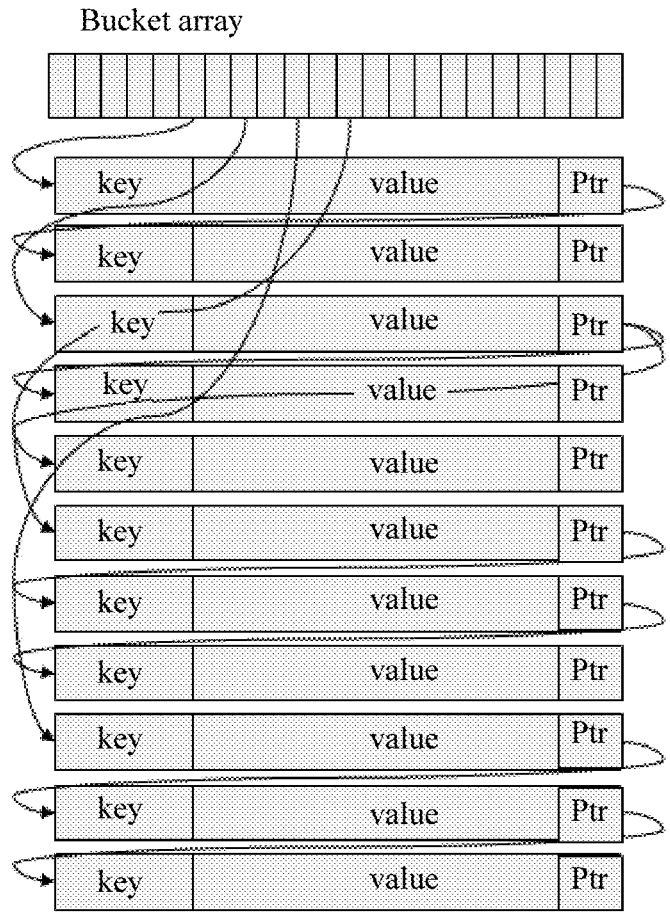
FIG. 1 is a schematic structural diagram of a hash database.
FIG. 2 is a schematic flowchart of a hash database configuration method according to a first embodiment of the present disclosure.

Referring to FIG. 2, FIG. 2 is a schematic flowchart of a hash database configuration method according to a first embodiment of the present disclosure. In this embodiment, the method includes the following steps.

Step S101: Establish an index area and a data area on a disk, where the index area includes p disk pages with an equal size.

The index area and the data area are established in a free space on the disk. The index area is used to store a key in a key-value pair in a hash database, and the data area is used to store a value in the key-value pair in the hash database, where the key is separated from the value in the key-value pair, the index area includes the p disk pages with an equal size, and each disk page is used to store keys with a same hash value. For example, a size of each disk page is 8 kilo (K) bytes.

Step S102: Receive an allocation request of key-value pairs, allocate m keys in the key-value pairs to disk pages in the index area, and allocate n values in the key-value pairs to the data area.

Furthermore, the key-value pairs are pre-configured in the hash database. The keys and the values are in a many-to-one relationship, that is, at least one key has a mapping relationship with one value. The key-value pairs include m keys and n values, where m≥n. The m keys are allocated to the p disk pages in the index area, and the n values are allocated to the data area.

A length of each key has a fixed value. It is assumed that the length of each key is 1K bytes and a capacity of each disk page is 8K bytes. Each disk page in the index area can store 8K/1K=8 keys. Considering that description information of a key needs to occupy a storage space, a quantity of keys that each disk page can store is actually 7. The m keys are allocated to the p disk pages, and a specific allocating method is as follows. A key on which a hash operation and a modulo operation have been performed is allocated to a disk page. If the hash operation has good uniformity, a probability at which each key is allocated to each disk page is equal, and the probability is 1/p. A probability at which a disk page is specified to be empty is $(1-1/p)\hat{\ }m$, and a quantity of empty disk pages (that is, disk pages on which a quantity of keys is 0) is $p*(1-1/p)\hat{\ }m$. When values of p and n are large enough, the quantity of the empty disk pages approximately equals $n*(1/e)\hat{\ }(m/n)$, and a probability at which a disk page is specified to have k keys is $C(m, k)*(1/p)\hat{\ }k*(1-1/p)\hat{\ }(m-k)$, where $C(m, k)$ indicates calculation of a combinatorial number. It is assumed that a quantity m of the keys equals 8000000 and a quantity p of the disk pages equals 2621431. A calculation result is shown in Table 1.

TABLE 1

| 0 | 1 | 2 | 3 | 4 | 5 | 6 | 7 | 8 | 9 | 10 | 11 | 12 |
|---|---|---|---|---|---|---|---|---|---|---|---|---|
| 123921 | 378859 | 577760 | 587049 | 447625 | 273051 | 138801 | 604 77 | 230 57 | 781 3 | 238 30 | 660 | 167 |

In Table 1, the first row indicates a quantity of keys allocated to a disk page, and the second row indicates a quantity of corresponding disk pages. For example, a quantity of disk pages to which zero keys are allocated is 123921, a quantity of disk pages to which one key is allocated is 378859, and a quantity of disk pages to which two keys are allocated is 577760.

Multiple types of blocks of a fixed length are used in the data area to implement a storage policy based on a variable length storage size. For example, a granularity of 64 mega (M) bytes is used for block division in the data area. Each block stores only data of a specified type, and a block is sliced inside and then managed by a free block pool (FBP)/allocator. Allocation and reclaiming are completed within an O(1) time, where the time that is mainly cost is a disk IO time of an FBP.

That a capacity of each disk page is 8K bytes and a size of a key is 1K is used as an example. Each disk page can store 8K/1K=8 keys, that is, one disk page can store eight keys. A sector is used as a basic unit when the disk is read. A large quantity of tests show that a time for reading a 4 K disk page is basically the same as that for reading an 8K disk page. Therefore, a method in which a large quantity of keys are stored on one disk page is used such that in the present disclosure, eight keys can be obtained by performing one IO operation. If a collision binary tree is used, a worst case is that eight disk IOs are needed before a last one leaf node is obtained. In this way, a case in which multiple disk IOs are needed in an original collision binary tree to obtain a key is avoided such that with the increase of the quantity of the keys, performance basically keeps stable.

Implementation of this embodiment of the present disclosure is as follows. Separating a key from a value in a key-value pair in a hash database, the key and the value are respectively stored into an index area and a data area that are established on a disk, when an operation request for the hash database is received, generating of a large quantity of disk IO operations is avoided, and when a quantity of key-value pairs is relatively large, a quantity of the disk IO operations is stable, thereby improving operation efficiency of the hash database.

Figure 3:
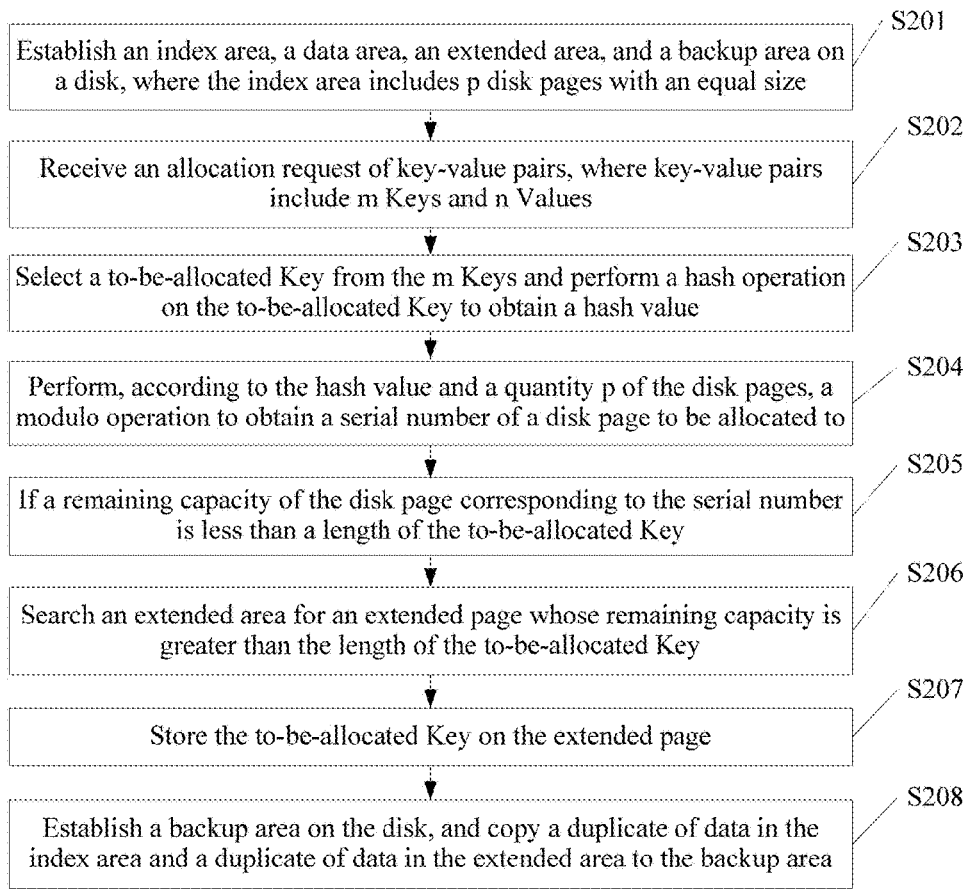
FIG. 3 is a schematic flowchart of a hash database configuration method according to a second embodiment of the present disclosure.

Referring to FIG. 3, FIG. 3 is a schematic flowchart of a hash database configuration method according to a second embodiment of the present disclosure. In this embodiment, the method includes the following steps.

Step S201: Establish an index area, a data area, an extended area, and a backup area on a disk, where the index area includes p disk pages with an equal size.

Figure 4:
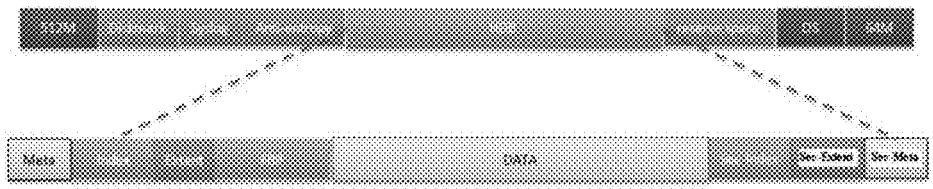
FIG. 4 is a schematic diagram of spatial layouts of a disk and a hash database according to an embodiment of the present disclosure.

Furthermore, referring to a schematic diagram of spatial layouts of a disk and a hash database in FIG. 4, FIG. 4 is a schematic diagram of a spatial layout of the disk, where an HDB indicates a hash database, and the HDB is located in a segment of continuous space on the disk. The hash database is divided into several areas. Meta, indicating metadata of the HDB and used to store description information of the HDB, such as information about a size of a partition or a size of a block. Index, indicating an index area and used to store a key in a key-value pair, where the index area includes p disk pages with an equal size and each disk page stores keys with a same hash value. Extent, indicating an extended area, used to store a key that overflows from a disk page in the index area, and including q extended pages with an equal size, and DATA, indicating a data area and used to store a value in the key-value pair, where multiple types of blocks of a fixed length are used to implement a storage policy based on a variable length storage size. For example, a granularity of 64 M bytes is used for block division in the data area. Each block stores only data of a specified type, and a block is sliced inside and then managed by an FBP/Allocator. Allocation and reclaiming are completed during an O(1) time, where the time that is mainly cost is a disk IO time of an FBP. The FBP is metadata of the DATA (data area) and used to store description information of the data area.

Step S202: Receive an allocation request of key-value pairs, where the key-value pairs include m keys and n values.

Furthermore, the key-value pairs are pre-configured in the hash database. The keys and the values are in a many-to-one relationship, that is, at least one key has a mapping relationship with one value. The key-value pairs include the m keys and the n values, where m≥n and a length of each key is fixed.

Step S203: Select a to-be-allocated key from the m keys and perform a hash operation on the to-be-allocated key to obtain a hash value.

Furthermore, a to-be-allocated key is randomly selected from the m keys, and a hash operation is performed on the to-be-allocated key. For example, a sha-1 algorithm with good randomness is used, and a hash value is obtained after the operation.

Step S204: Perform, according to the hash value and a quantity p of the disk pages, a modulo operation to obtain a serial number of a disk page to be allocated to.

A modulo operation is performed on p using the hash value obtained in step S203. A range of a value obtained after the modulo operation is from 0 to (p-1), where the value represents the serial number of the disk page to be allocated to. For example, the value obtained after the modulo operation is 3, and then the to-be-allocated key is allocated to a disk page whose serial number is 3.

Step S205: If a remaining capacity of the disk page corresponding to the serial number is less than a length of the to-be-allocated key.

Step S206: Search an extended area for an extended page whose remaining capacity is greater than the length of the to-be-allocated key.

Step S207: Store the to-be-allocated key on an extended page.

Furthermore, it is assumed that the length of each key is 1K bytes and a capacity of each disk page is 8K bytes. Each disk page in the index area can store 8K/1K=8 keys. Considering that description information of a key needs to occupy a storage space, a quantity of keys that each disk page can store is actually 7. The m keys are allocated to the p disk pages, and a specific allocating method is as follows. A key on which a hash operation and a modulo operation have been performed is allocated to a disk page. If the hash operation has good uniformity, a probability at which each key is allocated to each disk page is equal, and the probability is 1/p. A probability at which a disk page is specified to be empty is $(1-1/p)\,\hat{}\,m$, and a quantity of empty disk pages (that is, disk pages on which a quantity of keys is 0) is $p*(1-1/p)\,\hat{}\,m$. When values of p and n are large enough, the quantity of the empty disk pages approximately equals $n*(1/e)\,\hat{}\,(m/n)$, and a probability at which a disk page is specified to have k keys is $C\,(m,\,k)*(1/p)\,\hat{}\,k*(1-1/p)\,\hat{}\,(m-k)$, where $C\,(m,\,k)$ indicates calculation of a combinatorial number. It is assumed that a quantity m of the keys equals 8000000 and a quantity p of the disk pages equals 2621431. A calculation result is shown in Table 2.

TABLE 2

| 0 | 1 | 2 | 3 | 4 | 5 | 6 | 7 | 8 | 9 | 10 | 11 | 12 |
|---|---|---|---|---|---|---|---|---|---|---|---|---|
| 123 921 | 378 859 | 577 760 | 587 049 | 447 625 | 273 051 | 138 801 | 604 77 | 230 57 | 781 3 | 238 30 | 660 | 167 |

In Table 2, the first row indicates a quantity of keys allocated to a disk page, and the second row indicates a quantity of corresponding disk pages. For example, a quantity of disk pages to which zero keys are allocated is 123921, a quantity of disk pages to which one key is allocated is 378859, and a quantity of disk pages to which two keys are allocated is 577760.

It is assumed that a capacity of each extended page in the extended area is 4K bytes and a length of a key is 1K bytes. Considering that description information of a key needs to occupy a storage space, a quantity of keys that each extended page can store is actually 3. For a disk page to which 8, 9, or 10 keys are allocated, one extended page is needed to avoid an overflow, for a disk page to which 11, 12, or 13 Keys are allocated, two extended pages are needed to avoid an overflow, and for a disk page to which 14, 15, or 16 Keys are allocated, three extended pages are needed to avoid an overflow. That is, two disk IOs need to be cost for approximate 45000 keys during access to the index area, three disk IOs need to be cost for approximate 1000 keys during access to the index area, and keys that need to cost more than four disk IOs are less than 100.

Preferably, a bitmap technology is used to manage allocation and reclaiming of the extended pages in the extended area. It is assumed that a capacity of the extended area on the disk is 1 giga (G) bytes and that a capacity of each extended page is 8K bytes. In this case, a bitmap size of 32 kilobyte (KB) is needed. When a disk page in the index area overflows, an extended page is allocated for the overflowing disk page according to the bitmap, and a disk page and an extended page that have a same hash value are formed into a linked list, where the disk page is located at the head of the linked list and the linked list is further connected using "next" fields in disk pages.

The extended area is a public storage space of the index area. Because of the uniformity of the hash algorithm, basically few keys can be stored in the extended area such that performance is slightly affected. Even if a key is stored in the extended area because of a collision, compared with a collision binary tree in the prior art, it can still be ensured that the corresponding key is obtained with relatively less disk IOs. For example, a length of a key is 128 bytes, and when an extended page is added because of a collision, 128 keys can be stored in total, and two disk IOs are needed to obtain a largest collision key, while for the binary tree, 128 disk IOs are needed in a worst case.

Step S208: Establish a backup area on the disk, and copy a duplicate of data in the index area and a duplicate of data in the extended area to the backup area.

Furthermore, referring to FIG. 4, the backup area adjacently follows the DATA, and the backup area stores a duplicate Sec-Index of the Index (index area), a duplicate Sec-Extent of the Extent, and a duplicate Sec-Meta of the Meta.

A layout of the backup area is the same as that of a main area preceding the data area. For the sake of reliability, the backup area and the main area are not allocated at two consecutive areas. Instead, one area is allocated at the head of the disk, and the other area is allocated at the tail of the disk.

Preferably, to improve read/write efficiency and reduce a performance loss brought by a write operation in the backup area, data of the main area is written through, and a cache is designed for the backup area such that data of the backup area is delayed in being written into the disk. An integrity check is performed on each disk page. If check bits are not consistent, a disk page in a corresponding area needs to be read from the backup area. Check bit marks are set at the head of the index area in the main area and at the head of the index area in the backup area. Every time when the main area is selected after power-on, 1 is added to the check bit mark of the main area, and then the check bit mark is written into the disk. After normal power-off, 1 is added to the check bit mark in the cache in the backup area after the cache is refreshed such that data in the main area and data in the backup area are the same. When a power failure occurs, the mark of the main area and the mark of the backup area are not the same, and when a competition occurs between the main area and the backup area, the main area before the previous power-on is still selected as a main area, and a background recovery procedure is started such that the data in the main area and the data in the backup area are finally the same. By means of backup design, a case in which subtree data is lost in an original HDB when a node on a binary tree is lost can be avoided.

Figure 5:
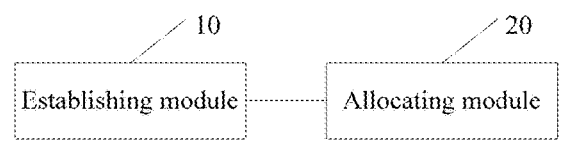
FIG. 5 is a schematic structural diagram of a hash database configuration apparatus according to a first embodiment of the present disclosure.

Referring to FIG. 5, FIG. 5 is a schematic structural diagram of a hash database configuration apparatus according to a first embodiment of the present disclosure. In this embodiment, the apparatus includes an establishing module 10 and an allocating module 20.

The establishing module 10 is configured to establish an index area and a data area on a disk, where the index area includes p disk pages with an equal size.

The allocating module 20 is configured to receive an allocation request of key-value pairs, allocate m keys in the key-value pairs to disk pages in the index area, and allocate n values in the key-value pairs to the data area, where m, n, and p are all integers greater than 1.

This embodiment and the first method embodiment are based on a same concept, and bring a same technical effect. For details, reference may be made to the description of the first method embodiment, and details are not described herein again.

Figure 6:
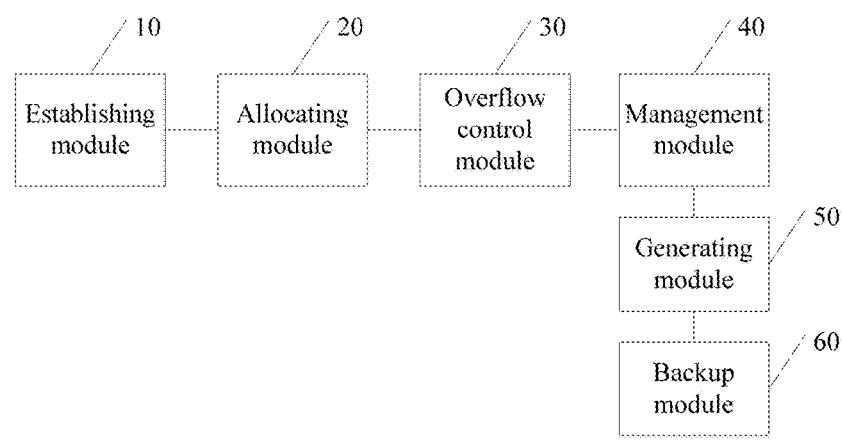
FIG. 6 is a schematic structural diagram of a hash database configuration apparatus according to a second embodiment of the present disclosure.

Further, referring to FIG. 6, FIG. 6 is a schematic structural diagram of a hash database configuration apparatus according to a second embodiment of the present disclosure. In this embodiment, in addition to the establishing module 10 and the allocating module 20, the apparatus further includes an overflow control module 30, a management module 40, a generating module 50, and a backup module 60.

The overflow control module 30 is configured to establish an extended area on the disk, where the extended area includes q extended pages with an equal size, and q is an integer greater than 1, and if a disk page in the index area overflows, store an overflowed key on an extended page.

The management module 40 is configured to manage, using a bitmap technology, allocation and reclaiming of the q extended pages in the extended area.

The generating module 50 is configured to form a disk page and an extended page that have a same hash value into a linked list, where the disk page is located at the head of the linked list.

The backup module 60 is configured to establish a backup area on the disk and copy a duplicate of data in the index area and a duplicate of data in the extended area to the backup area, where the backup area is not adjacent to the index area or the extended area.

Figure 7:
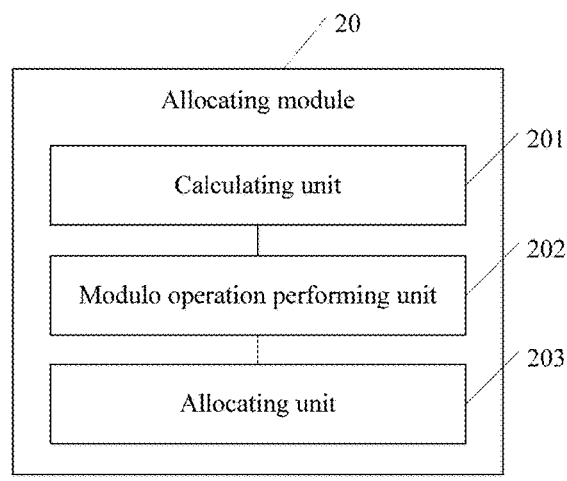
FIG. 7 is a schematic structural diagram of an allocating module shown in FIG. 6.

Optionally, referring to FIG. 7, the allocating module 20 includes a calculating unit 201 configured to select a to-be-allocated key from the m keys and perform a hash operation on the to-be-allocated key to obtain a hash value, a modulo operation performing unit 202 configured to perform, according to the hash value and a quantity p of the disk pages, a modulo operation to obtain a serial number of a disk page to be allocated to, and an allocating unit 203 configured to store the to-be-allocated key on the disk page corresponding to the serial number.

Further, the allocating unit 203 is configured to, if a remaining capacity of the disk page corresponding to the serial number is less than a length of the to-be-allocated key, search the extended area for an extended page whose remaining capacity is greater than the length of the to-be-allocated key, and store the to-be-allocated key on the extended page.

This embodiment and the second method embodiment are based on a same concept, and bring a same technical effect. For details, reference may be made to the description of the second method embodiment, and details are not described herein again.

Figure 8:
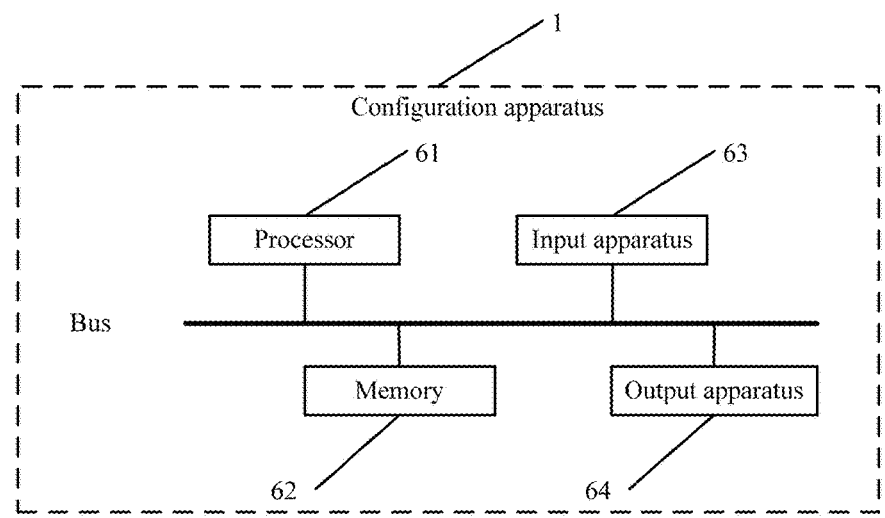
FIG. 8 is a schematic structural diagram of a hash database configuration apparatus according to a third embodiment of the present disclosure.

Referring to FIG. 8, FIG. 8 is a schematic structural diagram of a hash database configuration apparatus according to a third embodiment of the present disclosure, where the hash database configuration apparatus is hereinafter referred to as a configuration apparatus 1. The configuration apparatus 1 includes a processor 61, a memory 62, an input apparatus 63, and an output apparatus 64. There may be one or more processors 61 in the configuration apparatus 1, and one processor is used as an example in FIG. 8. In some embodiments of the present disclosure, the processor 61, the memory 62, the input apparatus 63, and the output apparatus 64 may be connected using a bus or in another manner, and a bus connection is used as an example in FIG. 8.

The memory 62 stores a group of program code, and the processor 61 is configured to invoke the program code stored in the memory 62 in order to perform the following operations. Establishing an index area and a data area on a disk, where the index area includes p disk pages with an equal size, and receiving an allocation request of key-value pairs, allocating m keys in the key-value pairs to disk pages in the index area, and allocating n values in the key-value pairs to the data area, where m, n, and p are all integers greater than 1.

In some embodiments of the present disclosure, the step of allocating, by the processor 61, m keys in the key-value pairs to disk pages in the index area includes selecting a to-be-allocated key from the m keys and performing a hash operation on the to-be-allocated key to obtain a hash value, performing, according to the hash value and a quantity p of the disk pages, a modulo operation to obtain a serial number of a disk page to be allocated to, and storing the to-be-allocated key on the disk page corresponding to the serial number.

In some embodiments of the present disclosure, the processor 61 is further configured to perform the following. Establishing an extended area on the disk, where the extended area includes q extended pages with an equal size, and q is an integer greater than 1, and if a disk page in the index area overflows, storing an overflowed key on an extended page.

In some embodiments of the present disclosure, the step of storing, by the processor 61, the to-be-allocated key on the disk page corresponding to the serial number includes, if a remaining capacity of the disk page corresponding to the serial number is less than a length of the to-be-allocated key, searching the extended area for an extended page whose remaining capacity is greater than the length of the to-be-allocated key, and storing the to-be-allocated key on the extended page.

In some embodiments of the present disclosure, the processor 61 is further configured to perform managing, using a bitmap technology, allocation and reclaiming of the q extended pages in the extended area.

In some embodiments of the present disclosure, the processor 61 is further configured to perform forming a disk page and an extended page that have a same hash value into a linked list, where the disk page is located at the head of the linked list.

In some embodiments of the present disclosure, the processor 61 is further configured to perform establishing a backup area on the disk, and copying a duplicate of data in the index area and a duplicate of data in the extended area to the backup area, where the backup area is not adjacent to the index area or the extended area.

Implementation of this embodiment of the present disclosure is as follows. Separating a key from a value in a key-value pair in a hash database, the key and the value are respectively stored into an index area and a data area that are established on a disk, when an operation request for the hash database is received, generating of a large quantity of disk IO operations is avoided, and when a quantity of key-value pairs is relatively large, a quantity of the disk IO operations is stable, thereby improving operation efficiency of the hash database.

A person of ordinary skill in the art may understand that all or some of the processes of the methods in the foregoing embodiments may be implemented by a computer program instructing relevant hardware. The program may be stored in a computer-readable storage medium. When the program runs, the processes of the methods in the foregoing embodiments are performed. The storage medium may include a magnetic disk, an optical disc, a read-only memory (ROM), or a random access memory (RAM).

What is disclosed above is merely exemplary embodiments of the present disclosure, but is not intended to limit the protection scope of the present disclosure. A person of ordinary skill in the art may understand that all or some of processes for implementing the foregoing embodiments and equivalent variations made based on the claims of the present disclosure also shall fall within the scope of the present disclosure.

What is claimed is:

1. A method of storing and retrieving data in a hash database, comprising:
   establishing an index area, a data area, and an extended area on a disk, the index area, the data area, and the extended area comprising different areas of the disk, the index area comprising p disk pages with a first size, the extended area comprising q disk pages with a second size, and p and q being integers greater than one;
   receiving an allocation request of key-value pairs;
   allocating each key of m keys in the key-value pairs to a disk page in the index area by:
      selecting a to-be-allocated key from the m keys, m being an integer greater than one;
      performing a hash operation on the to-be-allocated key to obtain a hash value;
      performing, according to the hash value and a quantity p of the disk pages, a modulo operation to obtain a serial number of a disk page to be allocated to;
      storing the to-be-allocated key without the value corresponding to the key on one of the p disk pages of the index area according to the serial number when a storage capacity available within the one of the p disk pages of the index area is greater than a storage capacity required to store the to-be-allocated key;
      storing the to-be-allocated key without the value corresponding to the key on one of the q disk pages of the extended area according to the serial number when the storage capacity available within the one of the p disk pages of the index area is less than the storage capacity required to store the to-be-allocated key; and
      generating a linked list comprising the one of the p disk pages of the index area and the one of the q disk pages of the extended area when the to-be-allocated key is stored to the one of the q disk pages of the extended area, wherein the linked list is formed by the one of the p disk pages of the index area and the one of the q disk pages of the extended area that have a same hash value;
   allocating n values in the key-value pairs to the data area, n being an integer greater than one;
   retrieving the data in the hash database by identifying a location of one of the n values in the key-value pairs in the data area according to the linked list; and
   managing, using a bitmap technology, allocation and reclaiming of the q disk pages of the extended area.

2. The method of claim 1, further comprising:
   establishing a backup area on the disk; and
   copying a duplicate of data in the index area and a duplicate of data in the extended area to the backup area, the backup area being neither adjacent to the index area nor to the extended area.

3. The method of claim 1, wherein a capacity of one disk page is set to store at least two keys, and the keys are allocated to a same disk page in the index area.

4. The method of claim 1, wherein the second size of the q disk pages in the extended area is greater than the first size of the p disk pages in the index area.

5. The method of claim 1, wherein the second size of the q disk pages in the extended area is twice a size of the first size of the p disk pages in the index area.

6. A device, comprising:
   a non-transitory memory configured to store instructions; and
   a computer processor coupled to the non-transitory memory and configured to execute the instructions to execute the following operations:
      establish an index area, a data area, and an extended area on a disk, the index area, the data area, and the extended area comprising different areas of the disk, the index area comprising p disk pages with a first size, the extended area comprising q disk pages with a second size, and p and q being integers greater than one;
      receive an allocation request of key-value pairs;
      allocate each key of m keys in the key-value pairs to a disk page in the index area by:
         selecting a to-be-allocated key from the m keys, m being an integer greater than one;
         performing a hash operation on the to-be-allocated key to obtain a hash value;
         performing, according to the hash value and a quantity p of the disk pages, a modulo operation to obtain a serial number of a disk page to be allocated to;
         storing the to-be-allocated key without the value corresponding to the key on one of the p disk pages of the index area according to the serial number when a storage capacity available within the one of the p disk pages of the index area is greater than a storage capacity required to store the to-be-allocated key;
         storing the to-be-allocated key without the value corresponding to the key on one of the q disk pages of the extended area according to the serial number when the storage capacity available within the one of the p disk pages is less than the storage capacity required to store the to-be-allocated key; and
         generating a linked list comprising the one of the p disk pages of the index area and the one of the q disk pages of the extended area when the to-be-allocated key is stored to the one of the q disk pages of the extended area, wherein the linked list is formed by the one of the p disk pages of the index area and the one of the q disk pages of the extended area that have a same hash value;
      allocate n values in the key-value pairs to the data area, n being an integer greater than one;
      retrieve the data in the hash database by identifying a location of one of the n values in the key-value pairs in the data area according to the linked list; and
      manage, using a bitmap technology, allocation and reclaiming of the q disk page of the extended area.

7. The device of claim 6, wherein the processor is further configured to:
  establish a backup area on the disk; and
  copy a duplicate of data in the index area and a duplicate of data in the extended area to the backup area, the backup area being neither adjacent to the index area nor to the extended area.

8. The device of claim 6, wherein a capacity of one disk page is set to store at least two keys, and the keys are allocated to a same disk page in the index area.

9. The device of claim 6, wherein the second size of the q disk pages in the extended area is greater than the first size of the p disk pages in the index area.

10. The device of claim 6, wherein the second size of the q disk pages in the extended area is twice a size of the first size of the p disk pages in the index area.

* * * * *